Feb. 6, 1940.  M. W. RUSSELL ET AL  2,189,272
SAND AND GAS TRAP
Filed Aug. 22, 1938  2 Sheets-Sheet 1
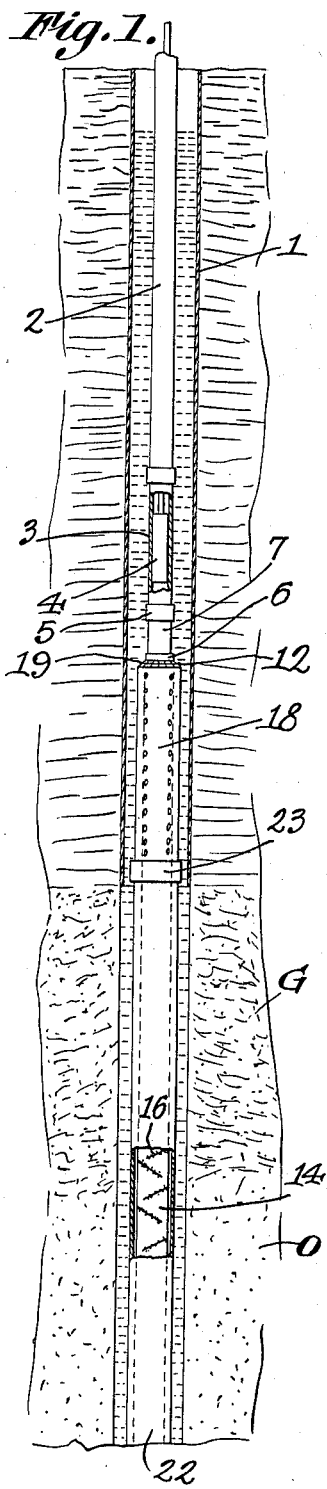
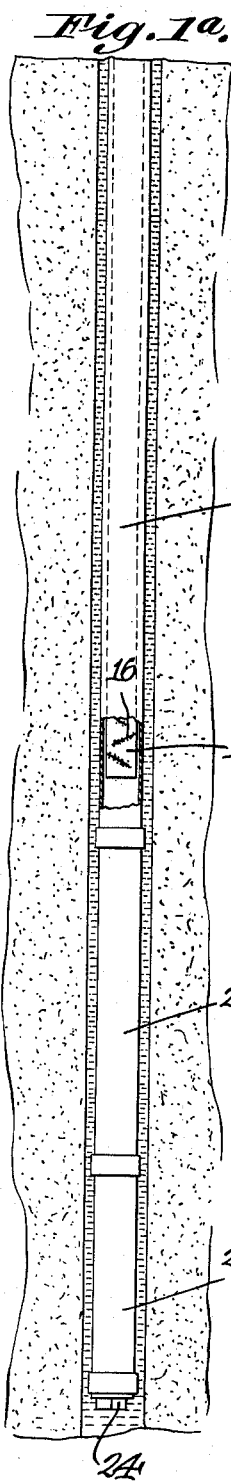
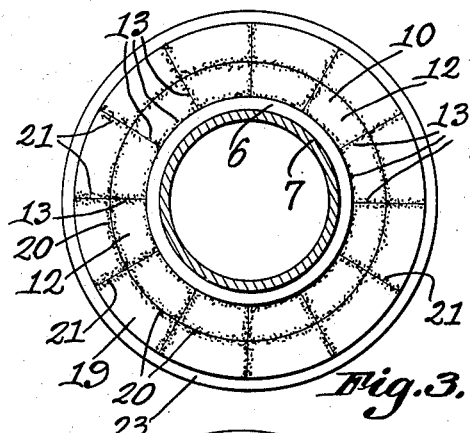
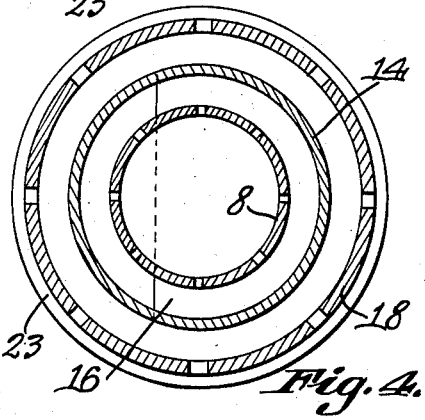
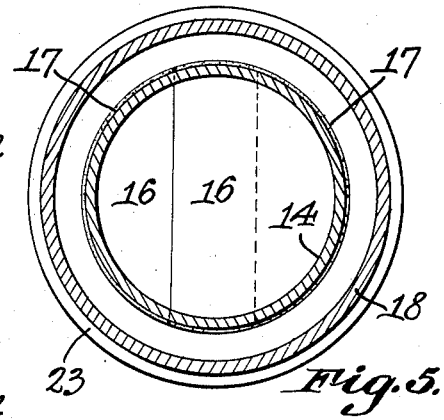
M. W. Russell
P. G. Miller
INVENTORS.
BY
ATTORNEYS.

Feb. 6, 1940.  M. W. RUSSELL ET AL  2,189,272
SAND AND GAS TRAP
Filed Aug. 22, 1938   2 Sheets-Sheet 2
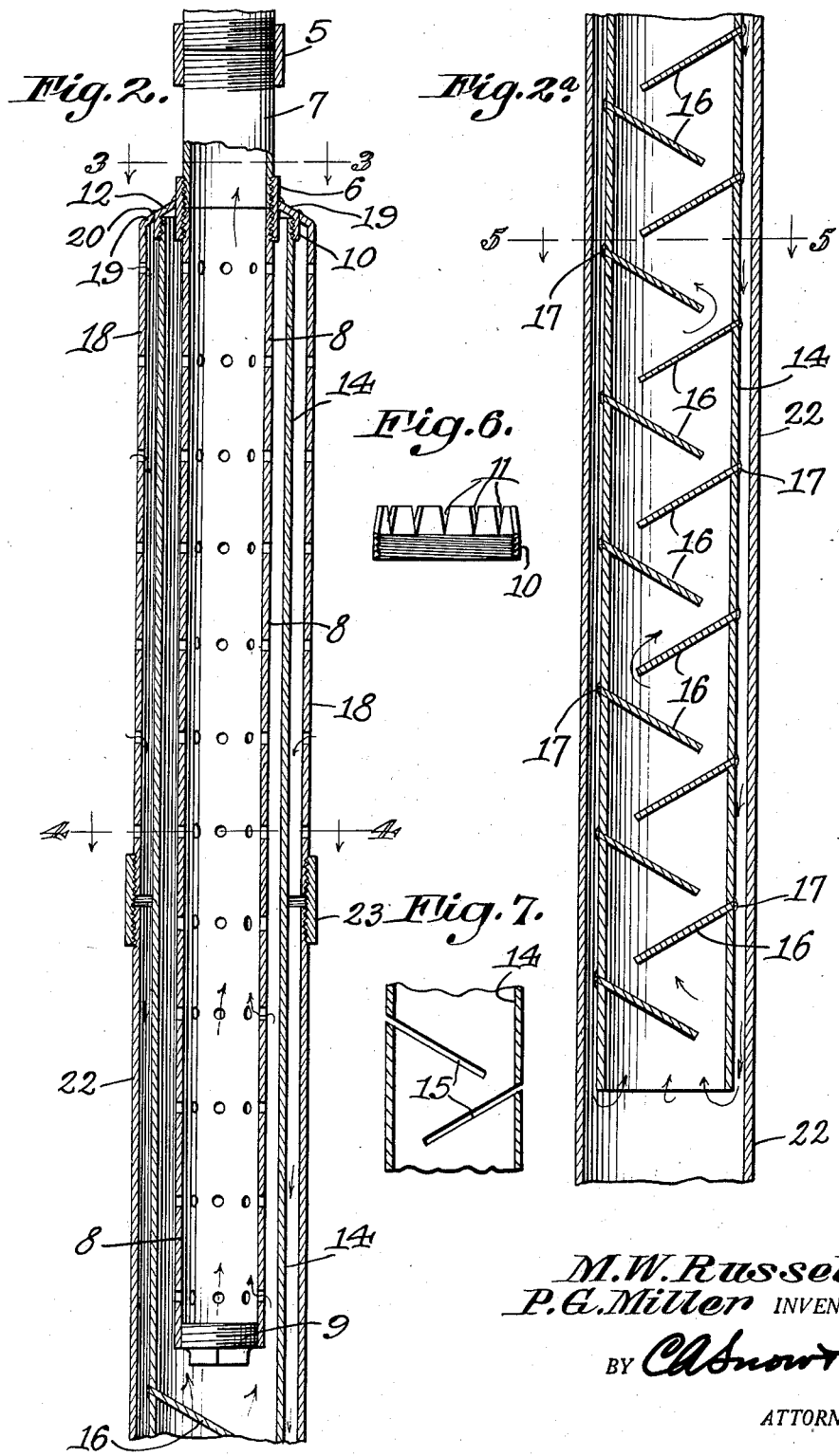
M. W. Russell
P. G. Miller INVENTORS.
BY C. A. Knowles.
ATTORNEYS.

Patented Feb. 6, 1940

2,189,272

UNITED STATES PATENT OFFICE 2,189,272

SAND AND GAS TRAP

Marvin W. Russell and Paul G. Miller,
Royalty, Tex.

Application August 22, 1938, Serial No. 226,164

1 Claim. (Cl. 210—57)

This invention relates to a sand and gas trap for use in oil wells, an object of the invention being to provide a simple but efficient trap which, when in its proper position within the well, will cause the sand and gas to separate from the oil before it enters the pump barrel, thereby reducing to a considerable extent the wear on the pump barrel, valves and teeth, eliminating valve sticking to a considerable extent, and cause the pump to operate more steadily and thereby increase production.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In the drawings

Figure 1 is a view partly in vertical section and partly in elevation of a portion of the apparatus constituting the present invention.

Figure 1a is a similar view showing the remaining or lower portion of the apparatus.

Figure 2 is an enlarged longitudinal section through the upper portion of the trap.

Figure 2a is a similar view through the lower portion thereof.

Figure 3 is an enlarged section on line 3—3 Figure 2.

Figure 4 is an enlarged section on line 4—4 Figure 2.

Figure 5 is an enlarged section on line 5—5 Figure 2a.

Figure 6 is a section of one of the collars before it has been contracted and welded.

Figure 7 is a section through a portion of the baffle barrel prior to the insertion of the baffles.

Referring to the figures by characters of reference, 1 designates the well casing in which is suspended the tubing 2 extending upwardly from the working barrel 3 of the pump 4.

The trap constituting the present invention is suspended from the lower portion of the working barrel to which it can be connected by a collar 5. This trap comprises a collar 6 having a nipple 7 extending upwardly therefrom to the collar 5 while screwed into and depending from collar 6 is a perforated suction barrel 8 the lower end of which is preferably closed by a screw plug 9.

An intermediate collar 10 is spaced from but concentric with the collar 6 and has its upper edge portion formed with incisions 11 so that said edge portion can be bent inwardly to form a tapered flange 12 joined to collar 6 by welding, it being understood that all of the slits formed by bending the edge portion of the collar are likewise sealed by welding. The welds referred to have been indicated at 13 in Figure 3.

A baffle barrel 14 is screwed at its upper end into the collar 10 and is concentric with the suction barrel 8. This baffle barrel is extended downwardly a desired distance into the gas and oil sands G and O and that portion of the baffle barrel below the suction barrel is formed with transverse slits 15 inclined inwardly and downwardly, said slits being extended into the barrel from opposed portions alternately and being extended short distances past the longitudinal center of the barrel. In each slit is seated the marginal portion of a segmental baffle plate 16 the inner straight edge of which extends transversely within the barrel. All of these plates are held in position by welding their outer arcuate edges to the adjacent portions of the wall of the barrel, as shown at 17. Thus the barrel is sealed where the baffle plates are joined thereto. Furthermore it will be noted that the inner portions of the baffles lap and as they are inclined downwardly and inwardly in opposite directions alternately, they cooperate to form a tortuous passage extending through the barrel from the bottom upwardly.

A liner barrel 18 having a plurality of apertures therein, is extended around and spaced from the upper portion of the baffle barrel and the suction barrel and the upper end of this liner barrel is contracted as indicated at 19 so as to fit snugly against the collar 10 to which it is joined by welding, as shown at 20 in Figure 3. To facilitate the inturning of the upper end of the liner barrel, the same is preferably cut in the same manner as has been illustrated in Figure 6, the gaps between the inturned portions being closed by welds as shown at 21. The liner barrel has an imperforate extension 22 joined thereto by coupling sleeve 23 and the lower end of this extension, which is disposed well below the baffle barrel 14, is closed by a plug 24.

The properly assembled parts thus far described are placed in the well to a depth dependent upon the depth of the well, the level of the oil in the well, and the location of the oil and gas sands. The location should be such that, as the oil and gas come out of the sand and start to rise in the well, the oil flows through the openings in the liner barrel 18 and then flows downwardly between said barrel and the baffle barrel 14 until the lower end of the baffle barrel is reached. During this movement of the oil any sand suspended therein will continue downwardly within the lower portion of the liner barrel, this separation of the sand from the oil being accelerated due to the whirling action set up by the oil as it reverses its direction of flow on reaching the lower end of barrel 14 and starts to ascend within said barrel. As the oil moves upwardly within the baffle barrel it must follow a tortuous course between the baffles and each baffle serves as a means for retarding the upward movement of sand with the oil so that the sand, thus trapped, tends to gravitate to the bottom of the liner barrel 22. After it has left the last baffle 16 during its ascent, the oil moves laterally into the apertured suction barrel and travels thence to the pump.

It has been found in practice that by employing a trap such as herein described, practically all of the sand held in suspension within the oil is separated therefrom and the oil is delivered practically free from sand and gas to the pump so that wear upon the working pass is thus greatly reduced.

What is claimed is:

A trap including an apertured suction barrel closed at its lower end, a baffle barrel surrounding and spaced from the suction barrel and extending therebelow, the baffle barrel being open at its lower end and closed at its upper end, superposed baffles within the baffle barrel and below the suction barrel, the baffles being inclined downwardly in opposite directions alternately thereby to provide a tortuous passage extending within the baffle barrel from the lower end thereof to the suction barrel, and a liner barrel extending around and below the baffle barrel and closed at both ends, said liner barrel having inlet openings near its upper end for the admission of oil into the space surrounding the baffle barrel.

MARVIN W. RUSSELL.
PAUL G. MILLER.